No. 865,982. PATENTED SEPT. 17, 1907.
L. F. ADT.
EYEGLASSES.
APPLICATION FILED DEC. 21, 1904.
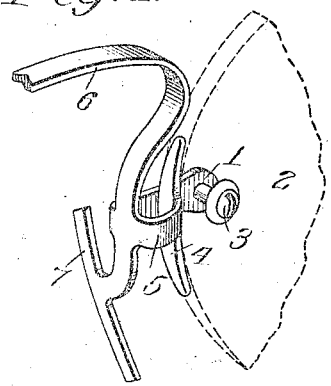
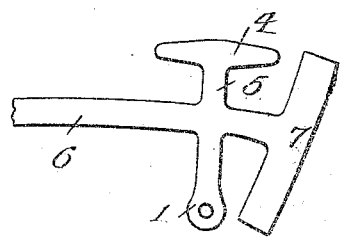
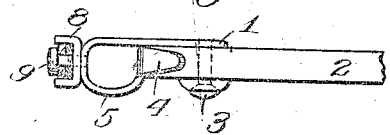
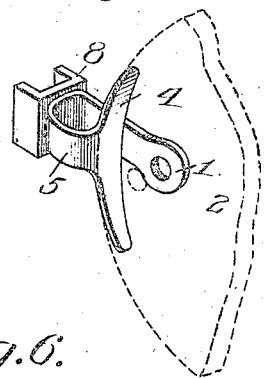
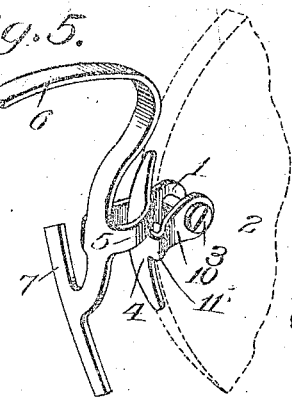
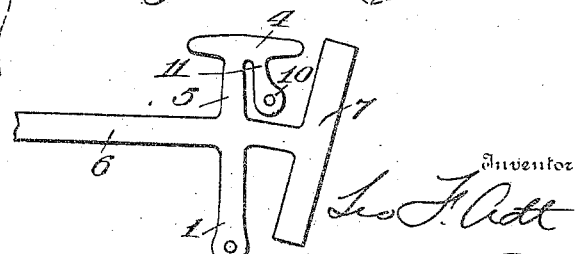

UNITED STATES PATENT OFFICE.

LEO F. ADT, OF TROY, NEW YORK.

EYEGLASSES.

No. 865,982.     Specification of Letters Patent.     Patented Sept. 17, 1907.

Application filed December 21, 1904. Serial No. 237,754.

*To all whom it may concern:*

Be it known that I, LEO F. ADT, of Troy, in the county of Rensselaer and State of New York, have invented certain new and useful Improvements in Eyeglasses; and I do hereby declare the following to be a full, clear, and exact description of the same, reference being had to the accompanying drawings, forming a part of this specification, and to the reference-numerals marked thereon.
My present invention relates to improvements in eyeglasses and spectacles and has particularly for its objects to provide an improved connection between the edges of the lenses and the other parts such as the bridges temples or nose guards, whereby not only is a firm connection established between the parts, not liable to become loosened in use, but one which may be readily formed from sheet metal, without liability of breaking.

Another object of the invention is to provide a connection which may be made adjustable within reasonable limits so that it is not necessary for an optician to carry in stock various sizes of clips for lenses in which the screw apertures are formed at different distances from the edge.
To these and other ends the invention consists in certain improvements hereinafter pointed out, the novel features being stated in the claims at the end of this specification.

In the drawings: Figure 1 is a perspective view showing my invention embodied as a part of an eyeglass mounting in which the spring, guard and clip are of one piece of material. Fig. 2 is a plan view of one side of the blank for the mounting shown in Fig. 1. Figs. 3 and 4 are plan and perspective views respectively of a clip having a box for the reception of the ordinary spring and nose guards. Figs. 5 and 6 are views of a blank and a clip formed therefrom showing a modification of the invention.

Similar reference numerals indicate similar parts in the several figures.

One of the principal features of the invention is the formation of an attaching device for lenses preferably formed of a single piece of sheet metal, having a portion to be secured to, or formed with, the spring, bridge, guards, temples or other part of the mounting; a lens-attaching ear 1, extending over one face of the lens 2 and perforated and threaded, if desired, for the usual holding screw or stud 3, and a connected edge bearing portion indicated by 4, embodying the upwardly extending arms, preferably arranged on the mounting opposite the lens attaching ear and bent inwardly or toward said ear to engage the edge of the lens above and below the plane of the screw, a relatively large bend or loop 5 being formed between the parts. This loop or bend affords material for adjusting the bearing portion 4 into close contact with the lens edge, if desired, to accommodate the clip to lenses having screw apertures at different distances from the edge, but its principal advantage is that it permits the employment of material that is relatively stiff and springy and cannot readily be bent at a sharp angle and therefore suitable for bridge springs, so that a whole eyeglass mounting may be made of a single stamping. Thus in Figs. 1 and 2 of the drawings, the spring, indicated by 6, the nose guard 7, the attaching lug 1, and the edge bearing portion 4 are formed from a single stamping or blank, one end of which is shown in Fig. 2, the other end of course, being the same, and the arrangement of the parts when formed up and ready for use is shown in Fig. 1. It will be noted that in this form of mounting there are no sharp bends in the material to form the bearing on the edge of the lens, and therefore no liability of breaking or injuring it in forming.

Although primarily adapted for single piece mountings embodying the spring, as shown, the construction and arrangement of the holding ear and the edge bearing portion from flat metal between, is one of the principal features of the invention and therefore it is embodied in holding clips shown in Figs. 3 and 4 in which a box 8 is attached to or formed upon the part intermediate the portions engaging the lens, for the attachment of any desired form of spring and nose guard, these being secured by the usual screw 9.

In the form of mounting shown in Figs. 5 and 6, the edge bearing arm 4 is provided with a perforated extension or ear 10, bent over upon the fold of the lens opposite the attaching ear 1, this mounting being formed from the blank shown in Fig. 5 and while in this construction the edge bearing portion 4 is not adjustable relatively to the aperture in the ear 1, a slight adjustment may be had by making a slight bend in the ear 10 as shown at 11.

Some of the advantages of clips in which the bearing portion 4 is adjustable is that the lenses are not liable to be broken by unequal expansion of the glass and metal and further the optician is enabled to fit them to lenses having apertures at different distances from the edge, without carrying a large stock of different sizes and also, the lenses may be kept tight, the loop portion 5 of the clips being capable of being bent and adjusted with ordinary pliers.

While I have shown in Figs. 1 and 2, constructions in which both the spring and guards are formed with the clip and this construction is preferable, it will be understood that a clip from which either or both of these members was omitted would be within the invention though it is preferable that the ear 1 and bearing portion 4 should extend from opposite edges of the intermediate portion of the clip which may well serve as the base or support, at least, of the other necessary parts of the complete mounting.

I claim as my invention:

1. A lens mount for eyeglasses composed of a single piece of material embodying a lens-attaching ear, a bearing portion adapted to engage the lens edge above and below the attaching ear, and an adjustable loop connected to the lens edge bearing portion intermediate its upper and lower ends and extending outwardly and joining the mount.

2. A lens mount having a lens attaching ear and a bearing portion for engaging the edge of the lens connected to the ear by a loop and adjustable substantially in the plane of the lens.

3. A lens mount having a lens attaching ear and a bearing portion for engaging the edge of the lens above and below the ear and connected thereto by an adjustable looped portion and adjustable substantially in the plane of the lens.

4. A lens mount having a lens attaching ear, a bearing portion for engaging the edge of the lens and a loop between the ear and bearing portion located beyond the edge of the lens.

5. A lens mount composed of a single piece of metal embodying the lens attaching ear, a bearing portion for engaging the edge of the lens and an adjustable loop intermediate the ear and bearing portion.

6. A lens mount composed of a single piece of sheet metal embodying the central portion or body, the lens attaching ear extending from one side thereof, and the bearing arm extending from the other side of the body, thence bent inwardly toward the ear and having the upper and lower extensions adapted to bear on the edge of a lens attached to the ear.

7. The combination with a lens, of a clip therefor having the central portion, the lens attaching ear extending from one side thereof and the arm extending from the other side toward the lens and thence inwardly toward the ear and bearing upon the edge of the lens and being free for adjustment.

8. The combination with a lens, of a clip therefor having the central portion, the lens attaching ear extending from one side thereof and the arm extending from the other side toward the lens, thence inwardly toward the ear and having the bearing portion engaging the edge of the lens above and below the point of attachment of the ear and free from other connection with the lens so that it may be bodily adjusted toward the edge of the latter.

9. The combination with a lens, of a mounting composed of a single piece of material embodying the spring, the lens attaching ear extending outwardly from one side of the spring and the free arm extending outwardly from the other side and then inwardly toward the ear and bearing upon the edge of the lens.

10. The combination with a lens, of a mounting composed of a single piece of sheet material, embodying the nose guard, the lens attaching ear extending from one side of the guard shank and the free arm extending from the other side of the guard shank toward the lens and then extending toward the ear and bearing upon the edge of the lens.

11. The combination with the lenses, of a mounting composed of a single piece of sheet material embodying the spring, the nose guards at the ends thereof, the lens attaching ears at one side of the spring and the arms extending outwardly from the other side of the spring and thence inwardly toward the ears and bearing upon the edges of the lenses.

12. An eyeglass mounting composed of a single piece of material embodying a bridge, and a nose guard, a lens attaching ear proceeding edgewise from the material of the mounting and extending outwardly to coöperate with a surface of a lens, a loop portion also proceeding outwardly from an edge of the mounting and having a loop formed therein, the outer end of the loop being provided with a lens edge bearing portion extending above and below the lens attaching ear.

LEO F. ADT.

Witnesses:
CHARLES S. ALDRICH,
K. BELLE KELLY.